June 16, 1931.  O. FABER  1,810,102
BEARING HOUSING FOR CANE MILLS OR THE LIKE
Filed Nov. 14, 1927    2 Sheets-Sheet 1
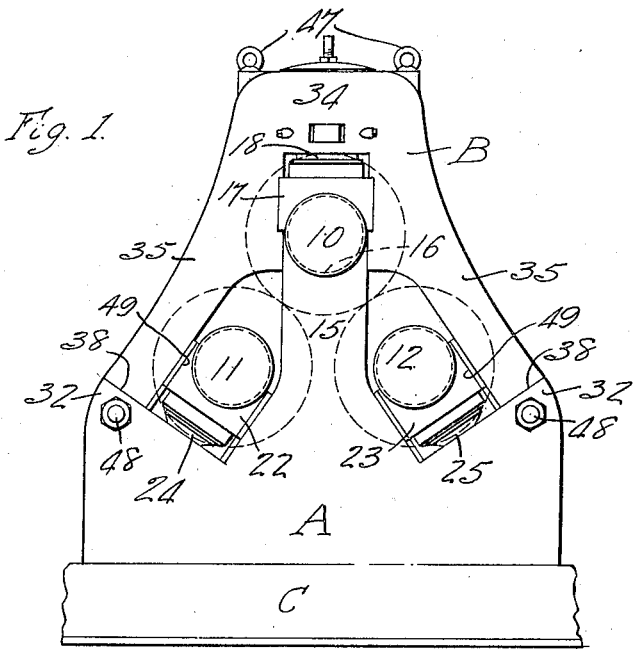
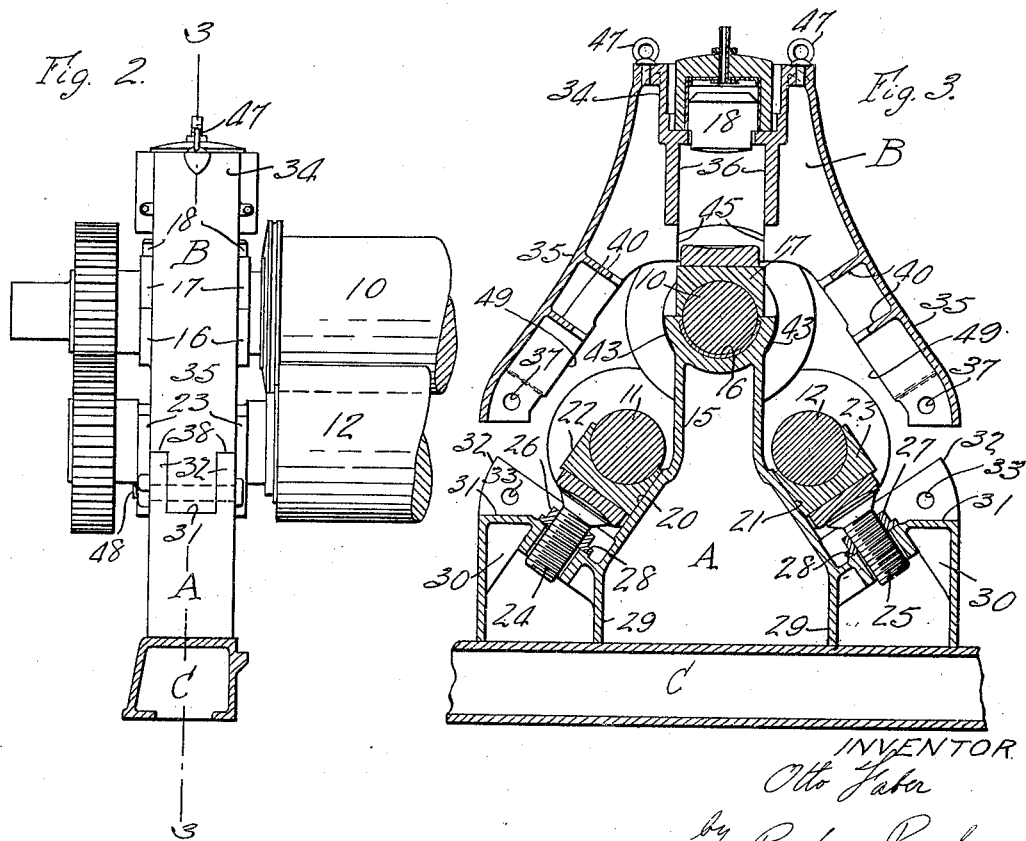

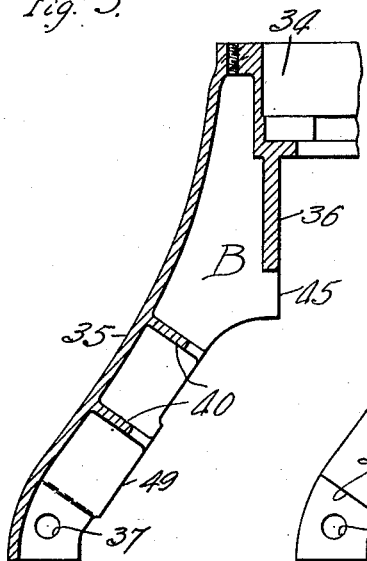
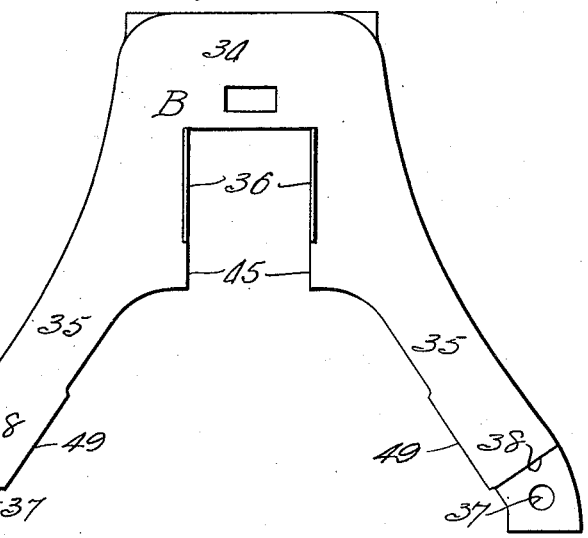
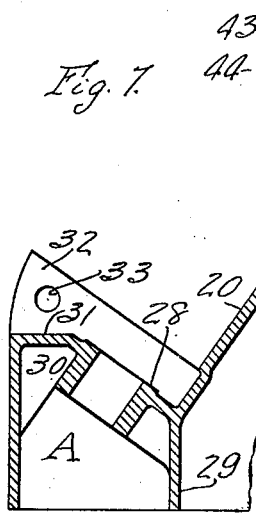
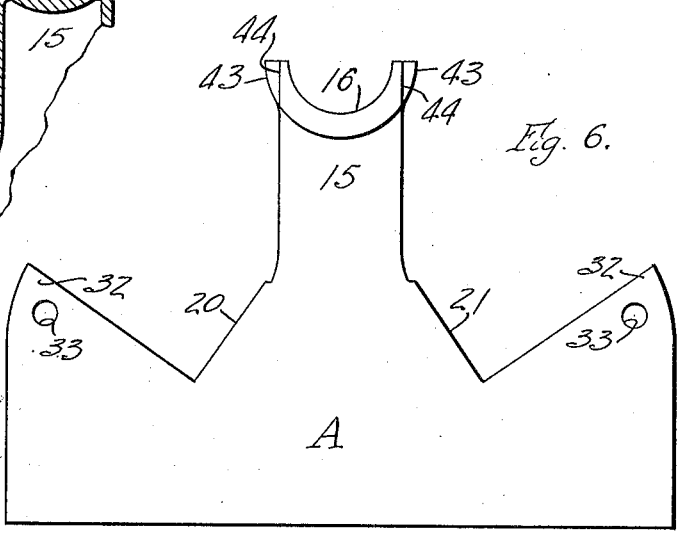

Patented June 16, 1931

1,810,102

UNITED STATES PATENT OFFICE

OTTO FABER, OF KENMORE, NEW YORK, ASSIGNOR TO THE GEO. L. SQUIER MFG. CO., OF BUFFALO, NEW YORK

BEARING HOUSING FOR CANE MILLS OR THE LIKE

Application filed November 14, 1927. Serial No. 233,092.

This invention relates to improvements in bearing housings for cane mills or analogous machines in which three rolls are employed with their axes arranged in triangular relation to each other.

Bearing housings of sugar cane mills must be capable of withstanding severe strains because of the fact that each bearing housing usually contains a hydraulically actuated plunger which presses one of the rolls toward the other two rolls and furthermore the bearing housing must be so constructed that any of the bearings may be readily accessible for the removal of one or more rolls. For this reason bearing housings of this kind have ordinarily been made of cast metal reinforced with upright and horizontal bolts and provided with recesses for the bearings, the recesses being closed by removable caps secured to the housing. Such structure, however, has the disadvantages that the bolts seriously interfere with the positioning of the bearings to best advantage, and the large recesses in the housing for the bearings, which are closed by bearing caps, are a source of weakness of the housing.

The objects of this invention are to provide a bearing housing for mills of this kind in which the reinforcing bolts usually necessary are entirely eliminated and in which the recesses in the sides of the housing and the bearing caps closing the recesses are also eliminated; also to provide a housing of this kind of a two piece construction which is so made that one of the pieces of the housing may be readily disconnected from the other piece and moved out of engagement therewith to render all of the bearings accessible; also to provide a housing of this kind which is so formed that the greater portion of the metal therein is so disposed as to best resist the strains to which the housing is subjected; also to provide a housing of this kind in which the parts thereof can be fitted together or taken apart upon the removal of two bolts or their equivalent; also to provide a housing of this kind in which one of the parts of the housing may be removed from the other part by lifting the same vertically, so that the housing can be readily taken apart or placed together by means of the usual derricks or cranes; also to provide a bearing housing of this kind which is simpler to construct, stronger, and which renders the bearings more accessible than in housings heretofore made; also to provide a bearing housing of this kind in which bearings of greater size may be used, so that, for example, roller or ball bearings may be employed in a housing of this kind; also to provide a bearing housing of this kind in which the two parts are provided with cooperating guide portions which assist in placing and holding the parts correctly in their operative positions; also to improve the construction of housings of this kind in other respects hereinafter specified.

In the accompanying drawings,

Fig. 1 is a face view of a bearing housing embodying my invention and showing the bearings in place therein.

Fig. 2 is an edge view thereof.

Fig. 3 is a central, sectional elevation thereof on line 3—3, Fig. 2, showing the two parts of the housing separated from each other.

Fig. 4 is an elevation of the upper or cap portion of the bearing housing.

Fig. 5 is a fragmentary, central sectional elevation thereof.

Fig. 6 is an elevation of the lower or bearing supporting member of the housing.

Fig. 7 is a fragmentary, central, sectional elevation thereof.

My improved bearing housing consists of a lower or bearing supporting member A which is preferably made of a single piece or casting, and an upper or cap portion B which preferably also is made of a single piece of material. C represents a base on which the bearing housing is mounted and which does not constitute a part of this invention. The member A of the housing is so constructed as to support the three roll shafts 10, 11 and 12 of the mill when the upper or cap member B is moved out of its operative position, and for this purpose, in the particular construction shown, the member A is provided with a central upwardly projecting pedestal or part 15 having a semi-circular recess 16 in the upper end thereof for receiving the upper roll shaft 10. During the normal operation of the mill the shaft 10 will not rest in the bearing 16 but will cooperate with a bearing 17 arranged above the shaft 10, which bearing is pressed downwardly by means of the usual hydraulic mechanism 18 mounted on the upper frame member B. The bearings for the two lower shafts 11 and 12 are preferably guided along inclined surfaces 20 and 21 which form the base of the pedestal portion 15. 22 and 23 represent bearings for the lower roll shafts but it will be understood that bearings of other kind than those shown may be used. These bearings are adjustable toward and from the axis of the upper roll shaft 10 by means of adjusting members 24 and 25 which have threaded stems engaging with nuts 26 and 27 supported on inclined seat portions 28 of the lower housing member A. These seat portions preferably have apertures through which the threaded stems of the adjusting members may extend. The nuts 26 and 27 may be turned in any suitable manner to effect the desired adjustment of the lower bearings. Because of the relative positions of the bearings on the lower member A, it will be obvious that these bearings will be supported on the lower member even if the upper or cap member B is entirely removed from the bearing housing.

The construction of the lower member A may be of any suitable or desired kind, that shown being made of cast metal and having integral front, rear and opposite side walls, this member being hollow or provided with spaces between the walls and open at its lower end. The walls may also be connected with transverse webs, such as the webs 29 shown in Figs. 3 and 7, and additional webs or reinforcing portions 30 may be provided connecting the front and rear walls of the housing and the seat portions 28 thereof since this portion of the lower housing member is subjected to the greatest amount of strain during the use of the mill. The member A is also provided at opposite ends thereof with seats or supporting surfaces 31 upon which the lower ends of the upper member B may rest, and the lower member A is also provided at opposite sides of the seats 31 with upwardly extending flanges 32, provided with holes or apertures 33 through which bolts or other connecting devices may pass for securing the upper and lower housing members together.

The upper or cap member B includes an upper portion 34 in which the hydraulic mechanism 18 is located, and a pair of oppositely and downwardly extending legs 35. At the upper ends of the legs and adjoining the top portion 34 are two oppositely disposed walls or webs 36 which form vertical guide surfaces for the upper roll shaft bearing 17, which is movable vertically and is pressed downwardly by the hydraulic mechanism 18.

The upper member may, if desired, also be of cast construction and the legs 35 thereof may be substantially U-shaped in cross section, opening toward each other, transverse webs 40 being provided for reinforcing the legs. In order to hold the upper portion of the pedestal 15 of the lower member A and the corresponding portion of the upper or cap member B in correct relation to each other, the bearing portion 16 at the upper end of the pedestal 15 of the lower member A is provided at opposite sides with outwardly projecting portions 43 which form with the sides of the pedestal portion shoulders or guide surfaces 44. The two oppositely arranged side walls or flanges 45 of the upper or cap member, below the guide walls 36 are adapted to engage the sides of the projections 43 and the shoulders or bearing faces 44. Consequently when the upper or cap member is lowered into its operative position with reference to the lower member, the lugs or projections 43 cooperating with the corresponding portions of the upper member and the lower ends of the legs of the upper member entering between the flange portion 32 of the lower member serve to hold the two parts of the housing in correct relation to each other. Other means for guiding the two parts of the housing into operative relation to each other and for holding them in such relationship may be provided, if desired. The legs of the upper member are preferably also provided with parts for cooperating with the surfaces 20 and 21 of the lower member for guiding the bearings 22 and 23, and in the construction shown, the inner edges of the flanges of the legs of the upper member are provided with guide parts 49 which serve this purpose. In order to facilitate the raising of the upper member, a pair of eye bolts 47 are preferably secured in the upper portion of the upper member.

In the housing described the main strains resulting from the pressure exerted on the upper bearings are taken up by the two sides or legs of the upper or cap member and transmitted to the lower member A through the bolts or other connecting devices 48, (Fig. 1) which pass through the apertures 33 and 37. Since the lower bearings are supported on the lower member A of the housing adjacent to the connection between this member and the upper or cap member, most of these stresses will be transmitted directly to the upper member without subjecting the intermediate portion of the lower member to severe strains. The two legs of the upper member extend substantially parallel to the direction of these stresses, so that these legs are not subjected to the twisting or torsional strains which are encountered in housings of this kind heretofore constructed. The bearing housing can consequently be made lighter than was heretofore possible, and at less expense and of greater strength. The construction described has the further advantages that the usual bearing caps are entirely eliminated and only two short bolts or their equivalents are necessary to hold the two parts together, so that the number of parts of the housing is greatly decreased. Furthermore upon the moving of the upper member vertically out of its operative relation to the lower member, all of the bearings and their shafts are immediately accessible so that any one of the rolls of the mill may be removed without removing the other rolls. The construction described also readily lends itself to the use of larger bearings, so that roller or ball bearings may be used in connection with the bearing housing described. The usual mechanism (not shown) for supporting and adjusting the guide or deflector plate for guiding the material from the space between the upper roll and one of the lower rolls into the space between the upper roll and the other lower roll may be mounted in the hollow pedestal of the lower housing member.

Claims:—

1. A bearing housing for cane mills or the like, including a lower portion provided with parts formed to receive and support three roll shafts at the apexes of a triangle with each shaft individually removable, and an upper member of unitary structure formed to descend over and straddle all of said roll shafts, secured at its lower ends to said lower member and having parts for confining all of the roll shafts in their operative positions when straddling the shafts.

2. A bearing housing for a cane mill or the like, including a pair of lower rolls and an upper roll, said bearing housing including a lower portion adapted to support the roll shafts in operative relation to each other, and an upper member secured to said lower member and serving to cooperate with said lower member to hold said roll shafts in operative relation to each other and having legs cooperating with the lower member to form guides along which the lower rolls may move toward and from the upper roll, and means by which the lower rolls may be adjusted along said guides.

3. A bearing housing for cane mills or the like, having two lower rolls and an upper roll cooperating with both of said lower rolls, said housing including parts for supporting the two lower roll shafts and an upwardly extending pedestal between said parts for supporting said upper roll shaft, and an upper member having downwardly sliding engagement with the lower member and straddling all of said roll shafts when descended upon the lower member, said upper member being held against movement laterally of the roll shafts on said lower member by said sliding engagement, and confining all of said shafts in operative rolling relation to one another.

4. A bearing housing for cane mills or the like, having two lower rolls and an upper roll cooperating with both of said lower rolls, said housing including parts for supporting the two lower roll shafts and an upwardly extending pedestal between said parts for supporting said upper roll shaft, and an upper member having downwardly extending legs straddling said roll shafts and adapted to be secured at their lower ends to said lower member, the inner faces of said legs being provided with parts adapted to cooperate with said parts on said lower member for guiding said lower rolls toward and from said upper roll.

5. A bearing housing for cane mills or the like, having two lower rolls and an upper roll cooperating with both of said lower rolls, said housing including parts for supporting the two lower roll shafts and an upwardly extending pedestal between said parts for supporting said upper roll shaft, and an upper member having downwardly extending legs straddling said roll shafts and adapted to be secured at their lower ends to said lower member, said upper member having parts at the upper ends of said legs for guiding said upper roll shaft in its movement toward and from said lower roll shafts.

6. A bearing housing for cane mills or the like including two lower rolls and an upper roll positioned to cooperate with said two lower rolls, said housing including a lower member having a substantially central upwardly extending part adapted to support the shaft of said upper roll, the sides of said upwardly extending part being formed to guide bearings for the lower roll shafts toward and from said upper roll, and an upper housing member having an upper portion provided with means for guiding the bearing of the upper roll shaft, and legs extending downwardly and adapted to be secured to said lower member and having parts adapted to cooperate with the bearings of said lower roll shaft for guiding the same toward and from said upper roll shaft.

7. A bearing housing for cane mills or the like including two lower rolls and an upper roll positioned to cooperate with said two lower rolls, said housing including a lower member having a substantially central pedestal portion adapted to support the upper roll shaft and having sides adapted to guide the bearings for said lower rolls, and an upper member adapted to guide the bearing for said upper roll and having legs extending substantially parallel to lines connecting the axes of the upper roll shaft with each of said lower roll shafts and secured at their lower ends to said lower member.

8. A bearing housing for a cane mill or the like including a pair of lower rolls and an upper roll, said housing including a lower member provided with parts adapted to support the roll shafts, an upper member removably secured to said lower member and having parts cooperating with the roll shaft bearings to hold the same in correct positions, and guide means on said two members for guiding said two members in correct relation to each other and for holding said members in correct operative positions.

9. A bearing housing for a cane mill or the like including a pair of lower rolls and an upper roll, said housing including a lower member provided with parts adapted to support the roll shafts, an upper member straddling said roll shafts and secured at its lower end to said lower member, and guide means at the upper portions of said upper and lower members for holding said upper portions in correct relation to each other.

10. A bearing housing for a cane mill or the like including a pair of lower rolls and an upper roll, said housing including a lower member provided with an upwardly extending pedestal for supporting the upper roll shaft and portions at the sides of said pedestal for supporting the lower roll shafts, and an upper member having parts cooperating with said pedestal for holding said upper and lower members in operative relation to each other and having legs extending downwardly and outwardly from said parts and adapted to be secured at their lower ends to said lower member and confining said lower roll shafts in their operative positions.

11. A substantially triangular bearing housing for cane mills or the like including a lower member forming the base of the triangle and provided with means for supporting an upper roll shaft and two lower roll shafts, and an upper housing member having two legs forming the sides of the triangle and secured at their lower ends to said lower member for transmitting stresses to said lower member resulting from the pressing of the upper roll against the two lower rolls.

12. A bearing housing for the rolls of cane mills or the like, comprising a frame having a lower part with a central pedestal for supporting one roll and at the base of the pedestal having upwardly and outwardly opening seats to receive and support the lower rolls, with the axes of all of the rolls corresponding to the apexes of a triangle, an upper member having a cap portion formed with a notch in its lower edge and central portion thereof to descend over and slidingly fit the central pedestal of the lower member and confine the upper roll against lateral movement on the pedestal, and also having legs straddling the lower rolls and confining them in their seats and removably attached to the lower member, whereby when said members are assembled the rolls will all be held in operative relation to one another, and when separated the three rolls will be supported upon the lower member in exposed positions enabling the individual removal of any roll without disturbing the others.

13. A bearing housing for a three roll mill in which the rolls are arranged with their axes at substantially the apexes of a triangle, said housing including a lower member having a central support for the upper of said shafts, and also having at each side thereof, guide seats approximately parallel to the sides of said triangle, with abutments at the lower ends of said seats, whereby the three rolls will be supported on said lower member and individually removable without disturbing the others, an upper member formed to descend over and straddle all of said shafts and confine said upper roll shaft against lateral displacement and confine the lower rolls to said inclined seats, and means by which said members may be connected together when assembled.

14. A bearing housing for cane mills or the like including a base portion formed to receive and support three roll shafts in triangular relation to one another with the shafts parallel to one another and individually removable from said base, and a cap member formed to descend over and be guided by said base while descending, said cap member having portions confining all of said shafts against displacement from the triangular relation, and means for detachably connecting said cap member and said base.

OTTO FABER.